(12) United States Patent
Sartori et al.

(10) Patent No.: US 8,777,801 B2
(45) Date of Patent: Jul. 15, 2014

(54) PLANETARY GEAR TRAIN AND CORRESPONDING PRODUCTION METHOD

(75) Inventors: Sergio Sartori, Samarate (IT); Filippo Ozzi, Samarate (IT); Giuseppe Gasparini, Samarate (IT)

(73) Assignee: AGUSTAWESTLAND S.p.A., Samarate (IT)

( * ) Notice: Subject to any disclaimer, the term of this patent is extended or adjusted under 35 U.S.C. 154(b) by 209 days.

(21) Appl. No.: 13/560,099

(22) Filed: Jul. 27, 2012

(65) Prior Publication Data

US 2013/0035197 A1   Feb. 7, 2013

(30) Foreign Application Priority Data

Jul. 29, 2011 (EP) ..................................... 11425207

(51) Int. Cl.
*F16H 57/08* (2006.01)
(52) U.S. Cl.
USPC ........................................................ 475/344
(58) Field of Classification Search
USPC ........................................................ 475/344
See application file for complete search history.

(56) References Cited

U.S. PATENT DOCUMENTS

| 1,644,222 | A | * | 10/1927 | Baker | 475/344 |
| 5,605,518 | A | * | 2/1997 | Kogure et al. | 475/344 |
| 2005/0020401 | A1 | * | 1/2005 | Ando et al. | 475/344 |
| 2012/0149516 | A1 | * | 6/2012 | Larrabee et al. | 475/5 |
| 2013/0035198 | A1 | * | 2/2013 | Enting et al. | 475/344 |

FOREIGN PATENT DOCUMENTS

| DE | 10106422 | 8/2002 |
| EP | 1626205 | 2/2006 |

* cited by examiner

*Primary Examiner* — Sherry Estremsky
(74) *Attorney, Agent, or Firm* — Leason Ellis LLP

(57) ABSTRACT

Described herein is a planetary gear train, comprising: a sun gear that can turn about an axis and comprises a plurality of first teeth; a fixed crown wheel comprising a plurality of second teeth; and two planetary gears, each comprising a plurality of third teeth, the planetary gears each meshing with the crown wheel and the sun gear and able to turn about second axes, which are in turn able to turn about the first axis; at least two third teeth simultaneously mesh with second teeth and further two third teeth simultaneously mesh with first teeth; the third teeth comprise a first and a second side, which have, respectively, a first and a second pressure angle different from one another; and the number of the third teeth is different from the absolute value of the semidifference between the number of the first teeth and of the second teeth.

15 Claims, 6 Drawing Sheets

PLANETARY GEAR TRAIN AND CORRESPONDING PRODUCTION METHOD

The present invention relates to a planetary gear train and to a method for producing said planetary gear train.

BACKGROUND OF THE INVENTION

As is known, helicopters are generally equipped with a plurality of transmission assemblies designed to transmit motion from one or more turbines to the rotors, the main rotor and/or the tail rotor, and/or from the turbine to a plurality of accessory devices, i.e., devices responsible, for example, for supplying the energy necessary for operation of the on-board equipment.

In the aeronautics sector, it is likewise known to set a mechanical transmission between the turbine and a drive shaft of the main rotor.

Said mechanical transmissions use generally as last reduction stage an epicyclic motor reducer designed to transmit the power with an adequate torque and r.p.m. to the rotor shaft.

Said epicyclic motor reducer basically comprises:
- a first gear, defined as "sun gear", which can turn about a first fixed axis;
- a second, fixed, gear, defined as "crown wheel", which has a second axis coinciding with the first axis; and
- a plurality of gears, defined as "planetary gears", which mesh with the sun gear and the crown wheel and are able to turn about respective third mobile axes.

Planetary gear trains further comprise a planetary-gear carrier, which is able to turn about the first axis and is connected to the planetary gears.

In this way, the planetary gears, in addition to turning about the respective third axes, are drawn in a motion of revolution about the first axis of the sun gear by the planetary-gear carrier.

In particular, the sun gear is connected to an input shaft and the planetary-gear carrier is used as output shaft connected to the rotor shaft.

In other words, the mechanical power enters the planetary gear train via the sun gear and is transmitted to the rotor shaft via the planetary-gear carrier, with the right torque and r.p.m.

The pressure angles of the teeth of the planetary gears (and of the sun gear or of the crown wheel) are generally greater than the pressure angles of the teeth of ordinary gear trains. More precisely, the pressure angles of the teeth of the planetary gears (and of the sun gear or of the crown wheel) are generally greater than 25° whilst the pressure angles of the teeth of the gears of ordinary gear trains are 20°.

Planetary gear trains of a known type are moreover conventionally sized in such a way that the number of teeth of the planetary gears is equal to the semidifference between the number of teeth of the crown wheel and of the sun gear. In this way, the pressure angles, i.e., the pressure angles used during generation by envelope, coincide with the angles of working pressure.

With reference to ordinary gear trains, there has been suggested, for example in EP-A-1939493, the use of a pair of gears, which have at least two teeth meshing simultaneously with one another in order to reduce the loads acting on each single tooth of the gear.

However, unlike ordinary gear trains, the teeth of the planetary gears of planetary gear trains must mesh cyclically both with the teeth of the sun gear on a first side and with the teeth of the sun gear on a second side.

Consequently, it is not possible to increase simply the number of teeth meshing between the planetary gears and the sun gear (or crown wheel) without preventing the aforesaid teeth from coming to simultaneously mesh on different sides thereof with the teeth of the sun gear and of the crown wheel.

On account of this, planetary gear trains of a known type have a number of teeth simultaneously meshing between the planetary gears and the sun gear (or between planetary gears and crown wheel) that is substantially equal to one.

Said arrangement is generally accepted in solutions of a known type in so far as the teeth of the planetary gears (and of the crown wheel and sun gear) are subjected to loads lower than the ones to which the teeth of an ordinary gear designed for transmitting the same power are subjected.

In fact, one of the peculiarities of planetary gear trains lies in the fact that the load that passes from the sun gear to the crown wheel is distributed substantially in a uniform way on each planetary gear.

In other words, said load is distributed over the teeth of the planetary gears meshing with respective teeth of the crown wheel and sun gear.

Particularly felt in the aeronautics sector is the need to obtain a planetary gear train that will increase as much as possible the ratio between the power transmitted and the weight of the gear train itself.

Said ratio is evidently of greatest importance in the aeronautics sector.

Finally, also felt in the sector is the need to render the transmission of motion to the rotor drive shaft as quiet as possible.

SUMMARY OF THE INVENTION

The aim of the present invention is to provide a planetary gear train for an aircraft that will enable at least one of the requirements set forth above to be met in a simple and economically advantageous way.

The aforesaid aim is achieved by a planetary gear train for an aircraft capable of fixed-point flight, comprising:
- a sun gear that can turn about a first axis and comprises a plurality of first teeth;
- a fixed crown wheel comprising a plurality of second teeth; and
- at least two planetary gears, each comprising a plurality of third teeth, said planetary gears each meshing with said crown wheel and said sun gear and being able to turn about respective second axes, which are in turn able to turn about said first axis;

said planetary gear being characterized in that:
- at least two of said third teeth simultaneously mesh with respective second teeth and a further two of said third teeth simultaneously mesh with respective first teeth; said planetary gear being characterized in that:
- said third teeth comprise a first side and a second side, which have, respectively, a first pressure angle and a second pressure angle that are different from one another; and
- the number of said third teeth of each of said planetary gears is different from the absolute value of the semidifference between the number of said first teeth of said sun gear and the number of said second teeth.

The present invention likewise regards a method for producing a planetary gear train for an aircraft capable of fixed-point flight, the planetary gear train comprising:
- a sun gear that can turn about a first axis and comprises a plurality of first teeth;
- a fixed crown wheel comprising a plurality of second teeth; and at least two planetary gears, each comprising a plurality of third teeth, said planetary gears each meshing with said crown wheel and said sun gear and being able to turn about respective second axes, which are in turn able to turn about said first axis;

said method comprising the step of:

setting at least two of said third teeth so that they mesh simultaneously with respective second teeth and a further two of said third teeth so that they mesh simultaneously with respective first teeth;

said method being characterized in that it comprises the steps of:

providing a first side and a second side of said third teeth, respectively, with a first pressure angle and a second pressure angle that are different from one another; and providing a number of said third teeth of each of said planetary gears different from the absolute value of the semidifference between the number of said first teeth of said sun gear and the number of said second teeth of said crown wheel.

BRIEF DESCRIPTION OF THE DRAWINGS

For a better understanding of the present invention, a preferred embodiment is described in what follows by way of non-limiting example and with reference to the attached drawings, wherein.

DETAILED DESCRIPTION OF THE INVENTION

Figure 1:
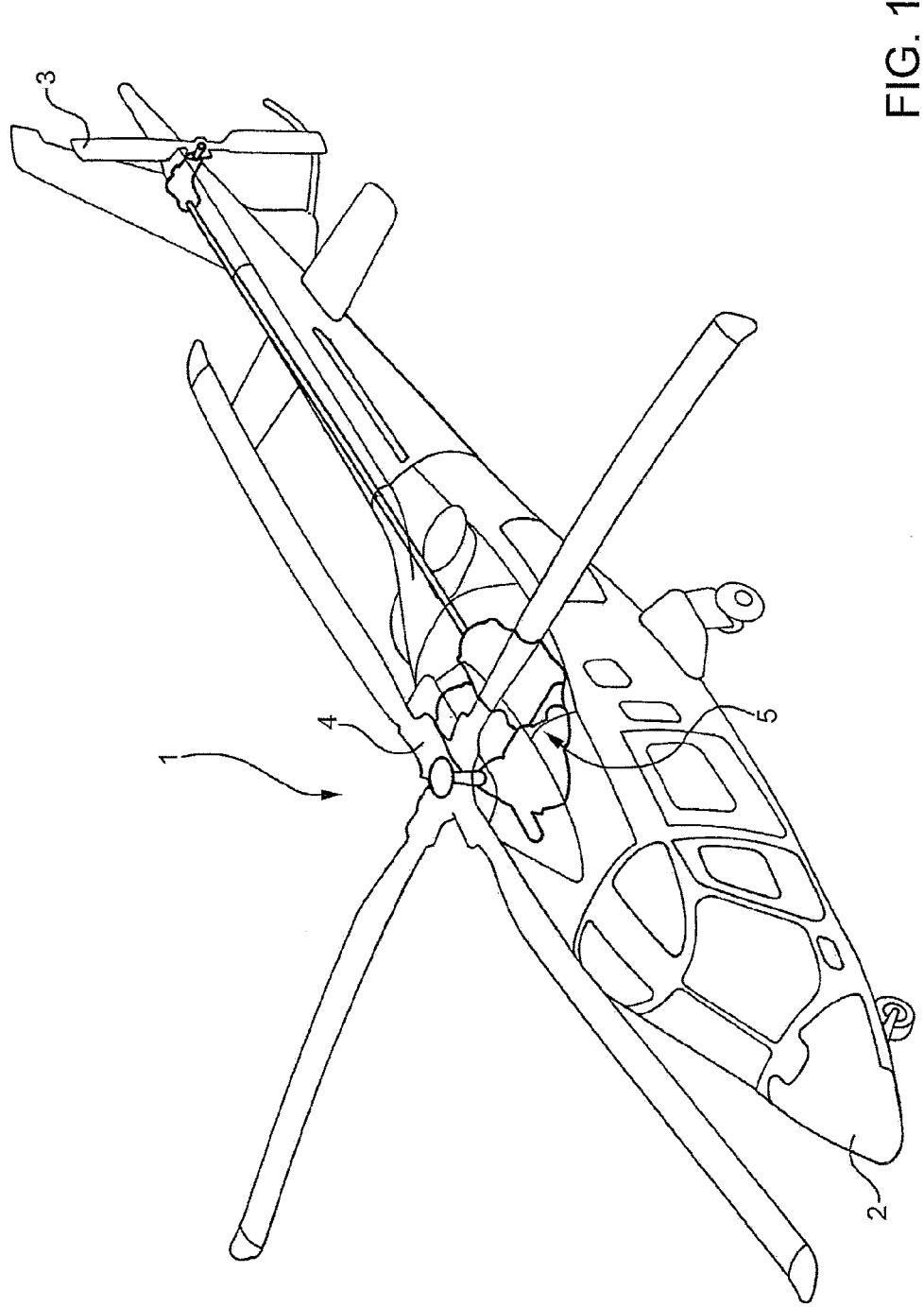
FIG. 1 illustrates an aircraft, in particular a helicopter, comprising a planetary gear train according to the present invention.
Figure 2:
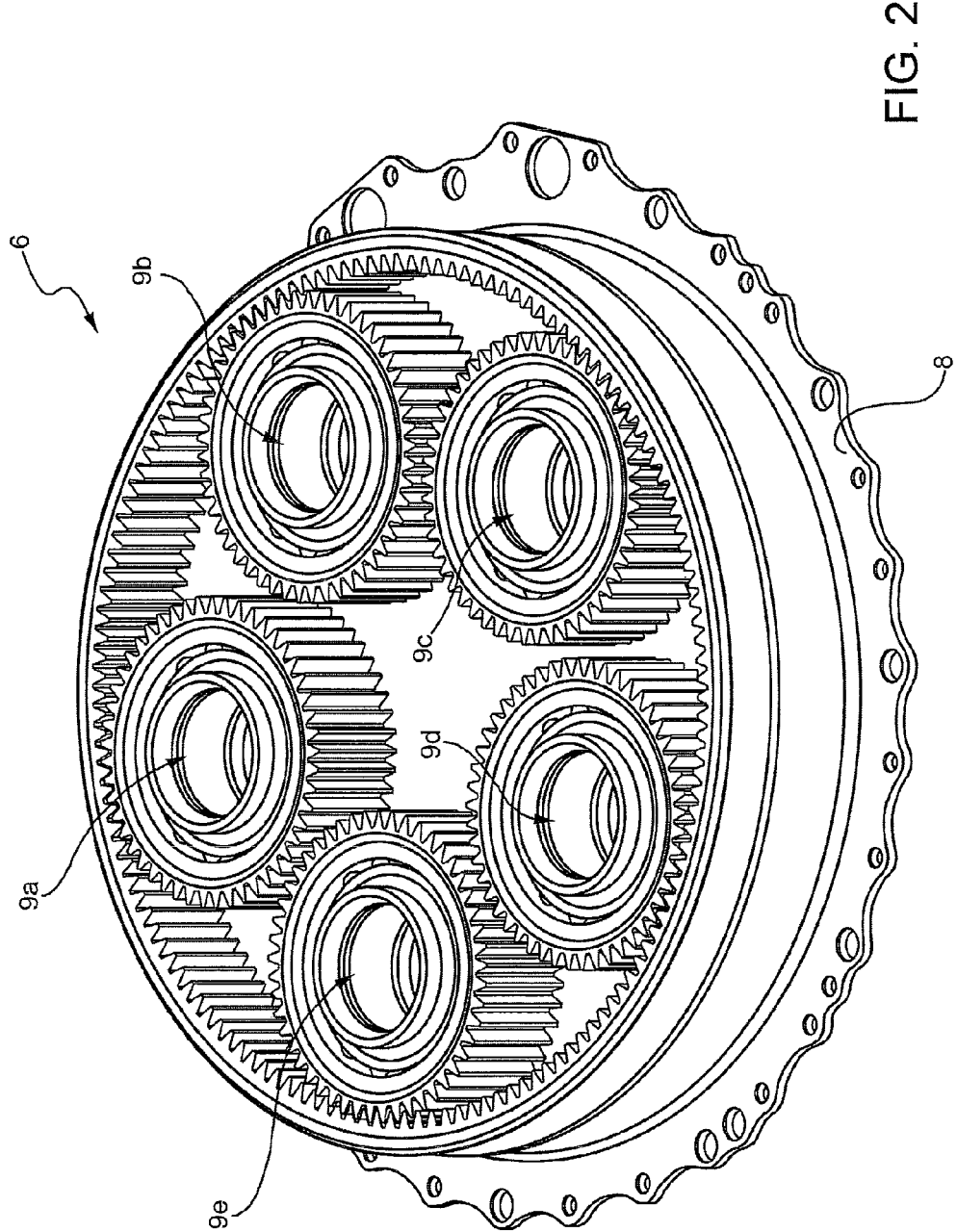
FIG. 2 is a perspective view of a planetary gear train incorporated in the aircraft of FIG. 1, with parts removed for reasons of clarity.

With reference to FIG. 1, designated by 1 is an aircraft capable of fixed-point flight; in the case in point a helicopter is illustrated.

The helicopter 1 basically comprises a fuselage 2, a main rotor 4 mounted on the fuselage 2 in such a way that it can turn in a first plane so as to generate an action for sustaining the entire helicopter in flight, and a tail rotor 3 set at one end of the fuselage 2. In particular, the rotor 3 is able to turn in a second plane transverse to the first plane for countering the rotational torque generated by the rotor 4 itself on the fuselage 2.

The helicopter 1 further comprises a main transmission assembly 5 designed to transmit the motion from a turbine (not illustrated) to a drive shaft (not illustrated) of the rotor 4 and an auxiliary transmission assembly driven by the transmission assembly 5 and driving the rotor 3.

The transmission assembly 5 further comprises a terminal stage formed basically by a planetary gear train 6, which transmits the power to the rotor drive shaft 4 with the right values of torque and angular velocity.

In the case in point illustrated, the planetary gear train 6 is a motor reducer.

Figure 3:
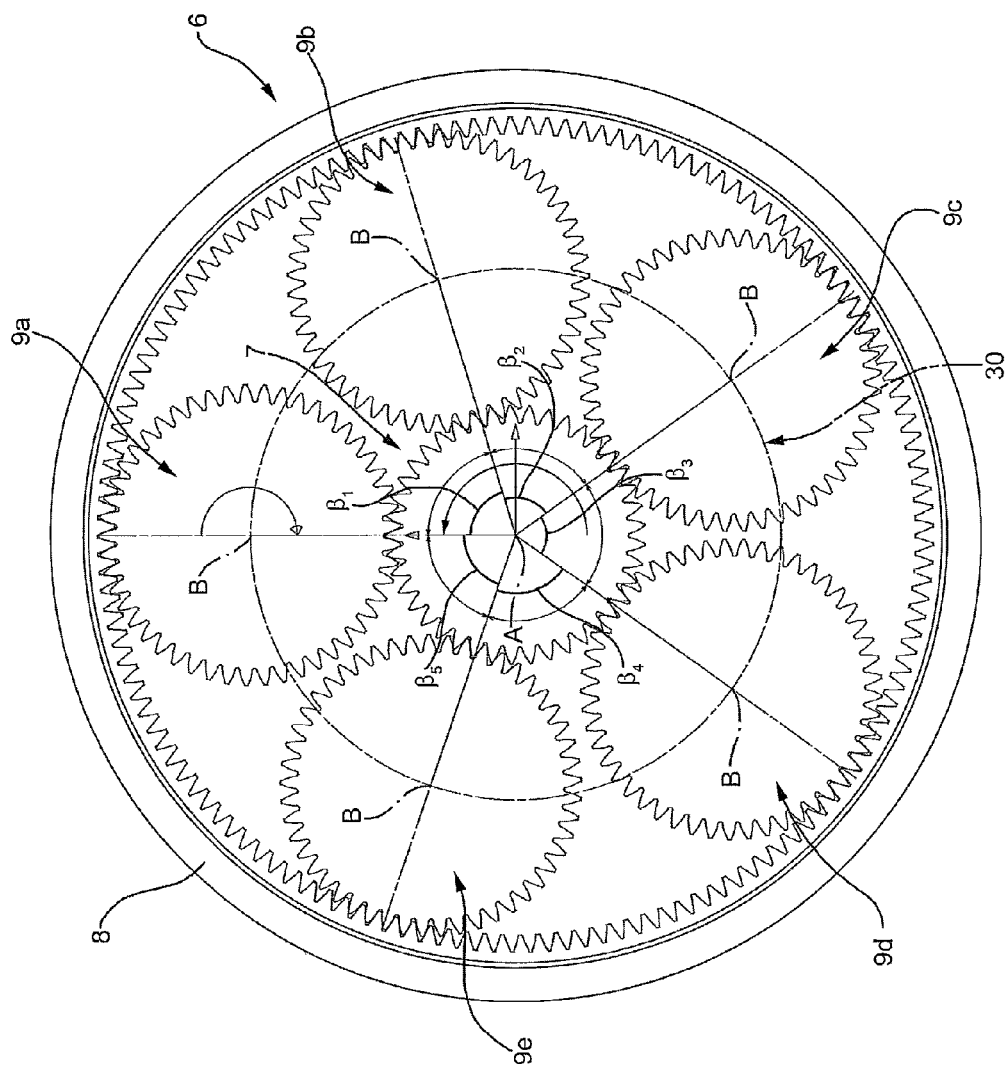
FIG. 3 is a cross section along the line II-II of FIG. 1.
Figure 4:
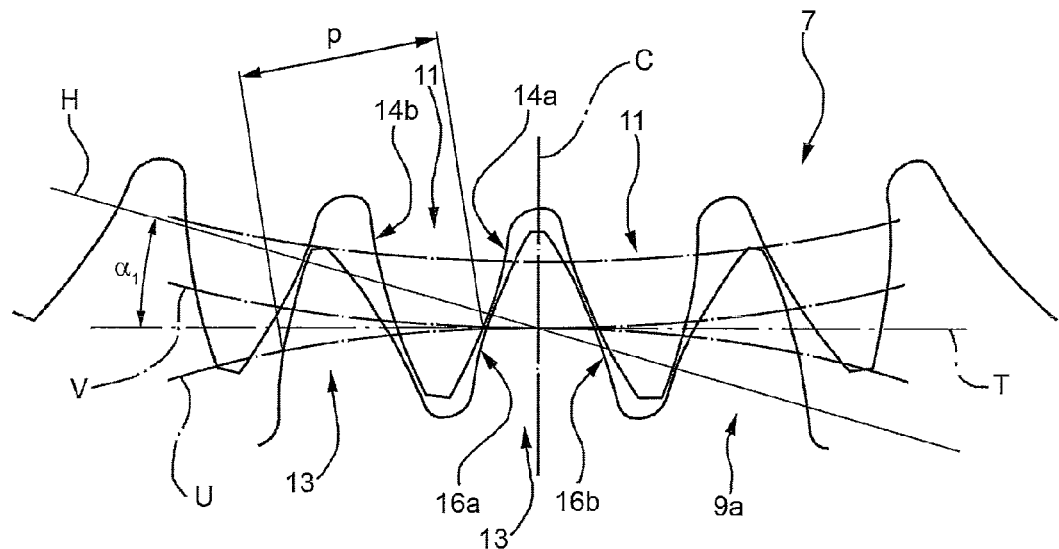
FIGS. 4 and 5 illustrate, at a markedly enlarged scale, respective details of FIG. 1.

With particular reference to FIGS. 3 and 4, the planetary gear train 6 basically comprises:

a sun gear 7 comprising a plurality of teeth 11, which can turn about an axis A and are operatively connected to an input shaft (not illustrated) of the stage 6;

a crown wheel 8 comprising a plurality of teeth 12 and extending about the axis A; and a plurality of planetary gears 9a, 9b, 9c, 9d, 9e comprising respective pluralities of teeth 13, which can turn about respective axes B parallel to the axis A, and mesh with the sun gear 7 and the crown wheel 8.

In the case in point illustrated, the crown wheel 8 has a diameter greater than that of the sun gear 7.

The planetary gear train 6 further comprises a planetary-gear carrier 30 (represented schematically in FIG. 3), which can turn about the axis A, directly connected to a drive shaft (not illustrated) of the rotor 4, and connected to the planetary gears 9a, 9b, 9c, 9d, 9e.

In this way, each planetary gear 9a, 9b, 9c, 9d, 9e turns about its own axis B and describes a motion of revolution about the axis A.

The mechanical power moreover enters the planetary gear train 6 at the sun gear 7 and exits therefrom, in the direction of the rotor shaft 4, at the planetary-gear carrier 30, with the right torque and r.p.m.

In particular, each tooth 11, 12, 13 comprises a respective pair of sides 14a, 14b; 15a, 15b; 16a, 16b.

The sides 14a, 14b; 15a, 15b; 16a, 16b of each tooth 11, 12, 13 are set on opposite sides of an axis C of the respective tooth 11, 12, 13.

More precisely, following upon rotation of each planetary gear 9a, 9b, 9c, 9d, 9e about the respective axis B and revolution of each planetary gear 9a, 9b, 9c, 9d, 9e about the axis A, the sides 16a of the teeth 13 co-operate cyclically with the sides 14a of the teeth 11 of the sun gear 7 and the sides 16b of the teeth 13 co-operate cyclically with the sides 15b of the teeth 12 of the crown wheel 8.

Advantageously, each planetary gear 9a, 9b, 9c, 9d, 9e comprises at least two teeth 13 simultaneously meshing with respective teeth 11 of the sun gear 7 and two further teeth 13 simultaneously meshing with respective teeth 12 of the crown wheel 8. The pressure angles $\alpha 1$, $\alpha 2$ of the sides 16a, 16b of the teeth 13 are different from one another, and the number ZP of the teeth 13 of each planetary gear 9a, 9b, 9c, 9d, 9e is smaller than the absolute value of the semidifference between the number ZS of teeth 11 of the sun gear 7 and the number ZS of teeth 12 of the crown wheel 8.

In the course of the present description, the term "pressure angle" $\alpha 1$, $\alpha 2$ indicates the pressure angle of the ideal toothing with which the sun gear 7, the crown wheel 8, and the planetary gears 9a, 9b, 9c, 9d, 9e are provided, said ideal toothing having the same module as the sun gear 7, the crown wheel 8, and the planetary gears 9a, 9b, 9c, 9d, 9e.

More precisely, the pressure angle $\alpha 1$ associated to the side 16a is smaller than the pressure angle $\alpha 2$ associated to the side 16b. In this way, the teeth 13 are asymmetrical.

In the case in point illustrated, the pressure angle $\alpha 1$ is of 19° and the pressure angle $\alpha 2$ is of 25°.

Said low value of the pressure angle $\alpha 1$ enables the number of teeth 13, 11 simultaneously meshing between planetary gears 9a, 9b, 9c, 9d, 9e and the sun gear 7 to be increased.

The reduction of the pressure angle $\alpha 1$ determines an increase in the bending stress resulting from the load acting on the tooth 13. This is due basically to the fact that the bending stress is proportional to the tangential force exchanged between the teeth 13 and the teeth 12 and, consequently, is proportional to the cosine of the pressure angle $\alpha 1$.

However, the increase in the pressure angle $\alpha 2$ determines an increase in the flexural strength of the tooth 13, which compensates the aforementioned increase in the bending stress. In fact, the increase in the pressure angle α2 determines an increase in the resistant section L, and hence, in the flexural strength, of the teeth 13. In other words, the increase in the pressure angle α2 renders the root portion 40 of the teeth 13 set between the axis C and the side 16b stumpier.

The number ZP of teeth 13 of each planetary gear is smaller than the absolute value of the semidifference between the number ZS of teeth 12 and the number ZC of teeth 11.

In other words $$Z_P < \left| \frac{Z_C - Z_S}{2} \right|$$

More in particular, the absolute value of the semidifference between the number ZS of teeth 13 and the number ZC of teeth 11 is greater than of the number ZP of teeth 13 by a value ranging from 2 to 4.

Figure 7:
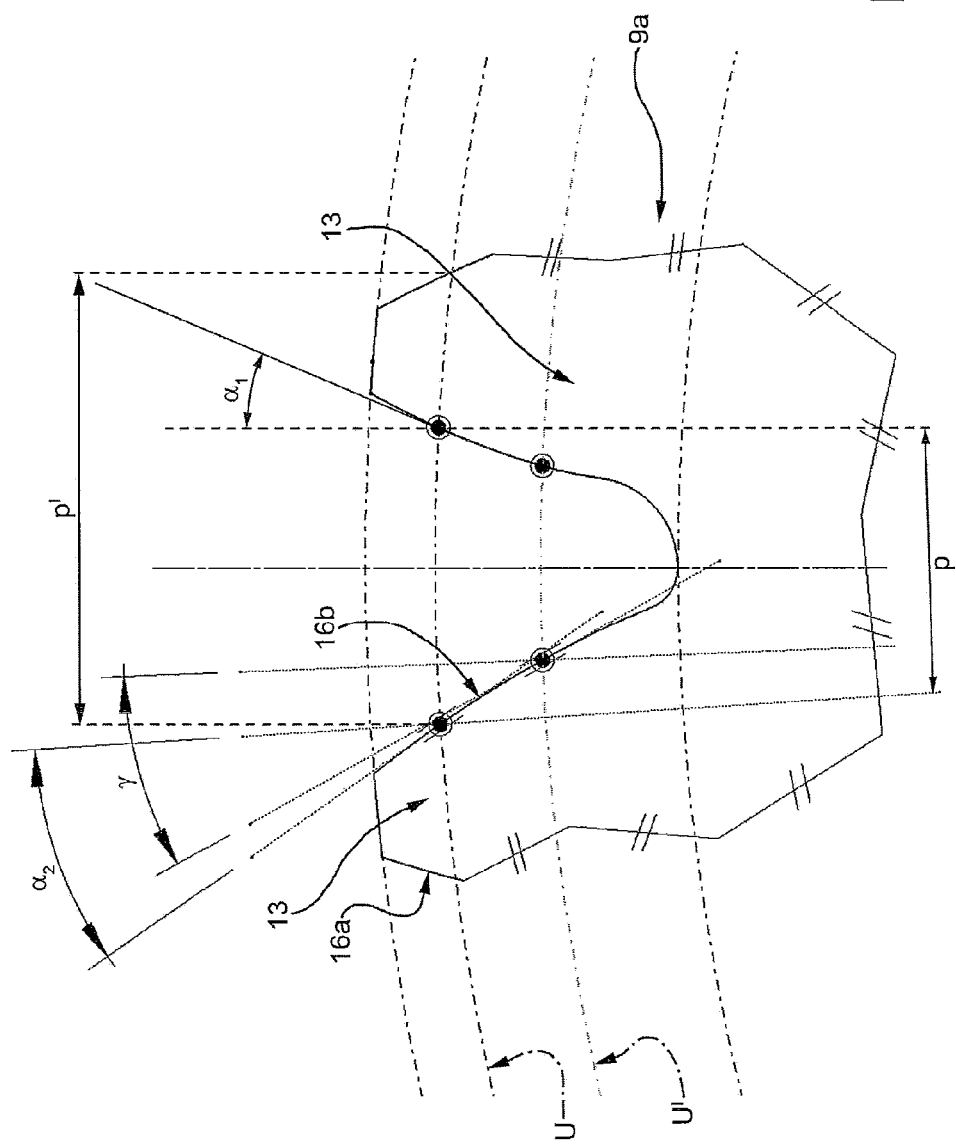
FIG. 7 illustrates, at an enlarged scale, some details of FIG. 1.

With reference to FIG. 7, on account of the reduction of the number of teeth ZP,
the sides 16a have a pitch circle U coinciding with the base circle of the sides 16a themselves; and
the sides 16b have a second pitch circle U' having a diameter smaller than the base circle of the sides 16a.

By the term "pitch circles" U, U' is meant the circles having their centre on the axes B of the planetary gears 9a, 9b, 9c, 9d, 9e that roll without sliding on respective pitch circles V, V' that are coaxial, respectively, with the sun gear 7 and the crown wheel 8.

By the term "base circles" is meant the circles that have their centre on the axes B of the planetary gears 9a, 9b, 9c, 9d, 9e that roll without sliding on ideal contact toothings, which are proportioned in a nominal way and have the same module as the teeth 13 and pressure angles α1, α2 on sides of their own that co-operate, respectively, with the sides 16a, 16b of the teeth 13.

Consequently, the pressure angle α1 coincides with the working pressure angle corresponding to meshing between the sides 16a of the teeth 13 and the sides 14a of the teeth 11.

Instead, the pressure angle α2 is smaller than the working pressure angle γ corresponding to meshing between the sides 16b of the teeth 13 and the sides 15b of the teeth 12.

Figure 5:
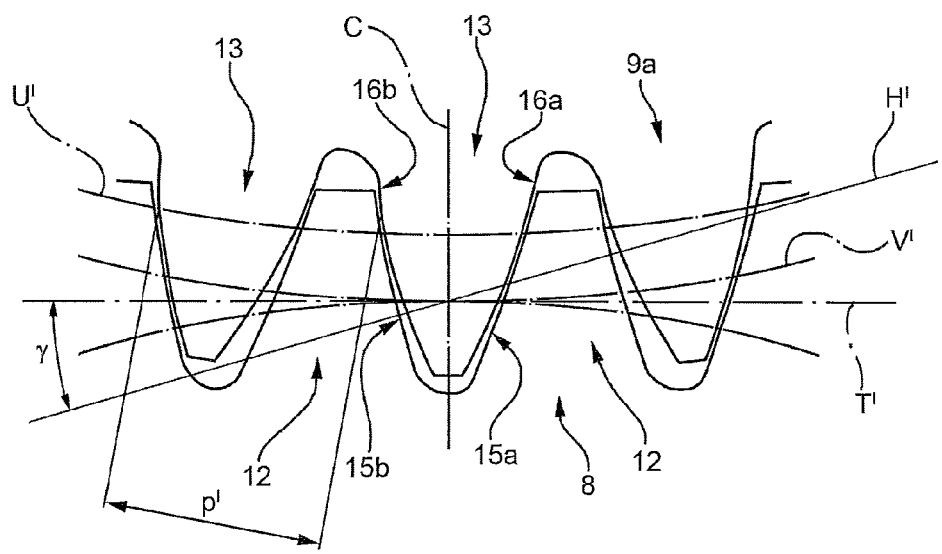

In particular, the working pressure angle γ is the angle that exists, on the pitch circle of the planetary gears 9a, 9b, 9c, 9d, 9e, between the tangent to the side 16b and the line joining the corresponding axes B to the point of intersection between the pitch circle of the planetary gears 9a, 9b, 9c, 9d, 9e and the side 15b itself (FIGS. 5 and 7).

The working pressure angle γ is smaller than the pressure angle α2 by a value ranging from 4° to 8°.

In the case in point illustrated, the working pressure angle γ associated to the side 16b ranges between 17° and 21°.

In this way, each planetary gear 9a, 9b, 9c, 9d and 9e has more than two respective teeth 13 simultaneously meshing with corresponding teeth 11 of the crown wheel 8 also with a pressure angle α2 of approximately 25°.

The planetary gears 9a, 9b, 9c, 9d, 9e, the sun gear 7, and the crown wheel 8 are designed so as to have a contact ratio greater than 2, i.e., in such a way that each planetary gear 9a, 9b, 9c, 9d, 9e presents more than two teeth 13 meshing with the teeth 11 of the sun gear 7 and more than two teeth 13 meshing with the teeth 12 of the crown wheel 8.

In particular, the term "contact ratio" indicates the ratio between the length of the arc of contact and the circumferential pitch p, p' associated to meshing of each planetary gear 9a, 9b, 9c, 9d, 9e with the sun gear 7 and the crown wheel 8.

In particular, the arc of contact is the arc measured along a pitch circle U (U') of each planetary gear 9a, 9b, 9c, 9d, 9e between the two points of intersection between the line of action H (H') and the addendum circles of the teeth 13 of the planetary gear 9a, 9b, 9c, 9d, 9e itself and the teeth 11 of the sun gear 7 (of the teeth 12 of the crown wheel 8). As is known, the line of action H (H') is the straight line along which the teeth 13, 12 (11) of the planetary gears 9a, 9b, 9c, 9d, 9e and of the sun gear 7 (of the crown wheel 8) exchange mutual forces of action and reaction. The line of action H, H' is inclined by the pressure angle α1 (working angle γ) with respect to a tangent T, T' common to the pitch circles U, V (U', V') of each planetary gear 9a, 9b, 9c, 9d, 9e and of the sun gear 7 (of the crown wheel 8).

The circular pitch p, p' is, instead, the distance between two homologous points of consecutive teeth measured on the pitch circle U, U' of each planetary gear 9a, 9b, 9c, 9d, 9e (FIGS. 4, 5 and 7).

As is known, the contact ratio, i.e., the number of teeth 13, 11 (12) simultaneously meshing, increases as the pressure angle α1 (γ) decreases. Moreover, all other parameters being equal, the contact ratio is greater for internal gears, such as in the case of meshing between the planetary gears 9a, 9b, 9c, 9d, 9e and the crown wheel 8, than for external gears, such as in the case of meshing between the planetary gears 9a, 9b, 9c, 9d, 9e and the sun gear 7.

Thanks to the fact that the pitch circles U, U' have different respective diameters, the contact ratio corresponding to mating between the sides 16a, 14a (i.e., to mating between the teeth 13, 11) is distinct from the contact ratio corresponding to mating between sides 16b, 15b (i.e., to mating between the teeth 13, 12).

In the case in point illustrated, the contact ratios of the sides 16a, 14a and 16b, 15b are both greater than 2.5.

The planetary gear train 6 comprises five planetary gears 9a, 9b, 9c, 9d, 9e that can turn about respective axes B parallel to the axis A.

In detail, the planetary gears 9a, 9b; 9b, 9c; 9c, 9d; 9d, 9e; 9e, 9a are set consecutively about the axis A.

Each pair of immediately consecutive planetary gears 9a, 9b; 9b, 9c; 9c, 9d; 9d, 9e; 9e, 9a defines a phase angle β1, β2, β3, β4, β5 (FIG. 3).

In detail, the phase angle β1 (β2, β3, β4, β5) is defined by the half lines joining the axis A with the axes B of the planetary gears 9a, 9b (9b, 9c; 9c, 9d; 9d, 9e; 9e, 9a). The aforesaid half lines are drawn orthogonal to the axes A, B.

The planetary gears 9a, 9b, 9c, 9d, 9e are set in such a way that they are not spaced at equal angles apart about the axis A. In other words, the phase angles β1, β2, β3, β4, β5 are not all the same as one another and equal to 72°, i.e., to the ratio between the full circle and the number of planetary gears 9a, 9b, 9c, 9d, 9e.

More precisely, the phase angles β1, β2, β3, β4, β5 are set, proceeding in the clockwise direction about the axis A, according to the sequence β1, β2, β3, β4, β5.

The phase angles β1, β4 are the same as one another and have an amplitude greater than the ratio between the full circle and the number of planetary gears 9a, 9b, 9c, 9d, 9e.

The phase angles β2, β3, β5 are the same as one another and have an amplitude smaller than the ratio between the full circle and the number of planetary gears 9a, 9b, 9c, 9d, 9e.

The teeth 11 and 12 of the sun gear 7 and of the crown wheel 8 are identical to the teeth 13 of the planetary gears 9a, 9b, 9c, 9d, 9e; i.e., they have sides 14a, 14b; 15a, 15b, which have respective pressure angles different from one another and equal, respectively, to α1, α2.

Figure 6:
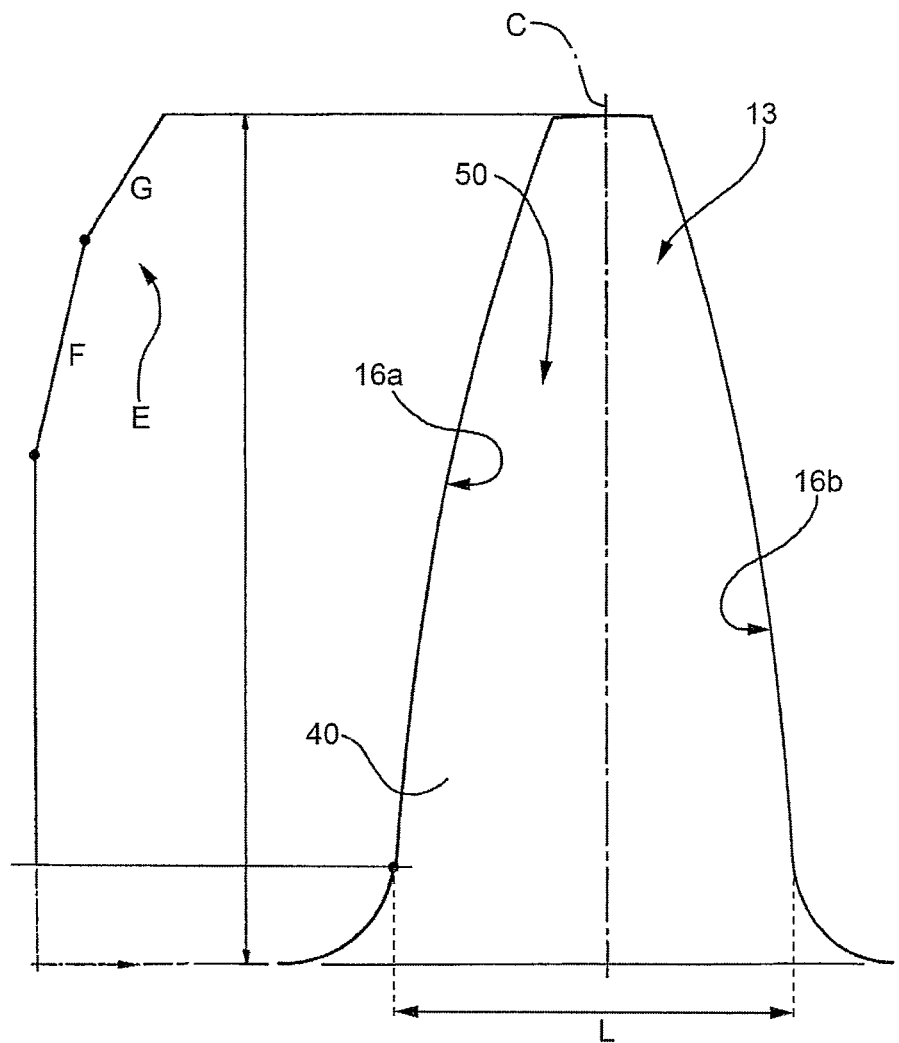
FIG. 6 illustrates, at a markedly enlarged scale, a detail of FIG. 1.

With reference to FIG. 6, the sides 14a, 14b; 15a, 15b; 16a, 16b of each tooth 11, 12, 13 have respective end portions 50, opposite to the corresponding root portions 40, that are relieved with respect to the corresponding starting involute profiles. In particular, the plots of the distances between the points of the profile of the sides 14a, 14b; 15a, 15b; 16a, 16b and the respective theoretical involutes measured orthogonal to the axis of the respective teeth 11, 12, 13 are defined by respective broken lines E formed by two segments F, G inclined with respect to one another, as illustrated in the European patent application No. 06425878.3, the contents of which is incorporated in the present patent application. Instead, the root portions 40 of each tooth 11, 12, 13 are shaped as respective involutes of circle.

In use, the power enters the planetary gear train 6 via the sun gear 7, which turns about the axis A.

Rotation of the sun gear 7 determines rotation of the planetary gears 9a, 9b, 9c, 9d, 9e about their own axes B and revolution of the planetary gears 9a, 9b, 9c, 9d, 9e themselves about the axis A. The planetary gears 9a, 9b, 9c, 9d, 9e also mesh with the fixed crown wheel 8, via the teeth 13, 11 (FIG. 4).

The planetary-gear carrier 30 thus turns about the axis B transmitting the power with the adequate r.p.m. to the rotor shaft 4.

From an examination of the planetary gear train 6 and of the method according to the present invention, the advantages that it affords are evident.

In particular, the planetary gear train 6 presents a synergistic combination of constructional characteristics, which enable the ratio between power transmitted to the rotor shaft to be increased given the same weight.

The achievement of the aforesaid advantages is of extreme importance in the aeronautics sector, where any saving in weight automatically means a reduction of consumption or an increase in payload.

More precisely, the constructional parameters of the planetary gear train 6 have been designed by the applicant in such a way as to ensure that each planetary gear 9a, 9b, 9c, 9d, 9e will have at least two teeth 13 simultaneously meshing with respective teeth 11 of the sun gear 7 and at least two further teeth 13 simultaneously meshing with respective teeth 12 of the crown wheel 8.

In particular, the constructional parameters of the planetary gear train 6 have been designed in such a way that the contact ratio of the teeth 13, 11 and of the teeth 13, 12 is greater than 2.5.

In this way, the stresses deriving from loads acting on the teeth 11, 12, 13 are drastically reduced as compared to planetary gear trains of a known type, where the contact ratio is substantially comprised between 1 and 2.

In greater detail, in the first place the pressure angles α1, α2 of the sides 16a, 16b of the teeth 13 are different from one another.

The smaller pressure angle α1 enables having at least two teeth meshing 11, 13 simultaneously between each planetary gear 9a, 9b, 9c, 9d, 9e and the sun gear 7.

In this way, it is ensured that the contact ratio associated to the meshing between the teeth 13, 11 is greater than 2.5.

At the same time, the reduction of the pressure angle α1 determines an increase in the tangential component of the force acting on the teeth 13. In fact, said component is proportional to the cosine of the pressure angle α1. However, thanks to the fact that the pressure angle α2 is greater than the pressure angle α1, the teeth 13 have a resistant section L and hence a flexural strength increased as compared to what would be obtained with a pressure angle α1 also for the sides 16b.

Consequently, the teeth 13 can withstand the increased bending stress.

In other words, the differentiation of the pressure angles α1, α2 enables the contact ratios associated to the meshing between teeth 13, 11 to be increased on both of the sides 16a, 16b—and hence enables a reduction of the stresses resulting from the loads acting on the teeth 13, 11 themselves—without thereby worsening the flexural strength of the teeth 13.

In the second place, the number ZP of teeth 13 is smaller than the absolute value of the semidifference between the number ZS of teeth 11 and ZC of the crown wheel 12, and, consequently is smaller than the number of teeth envisaged for the planetary gears according to a conventional proportioning.

It follows that the diameter of the planetary gears 9a, 9b, 9c, 9d, 9e is smaller than the diameter that would be obtained by imposing the tangency of the pitch circles of the planetary gears 9a, 9b, 9c, 9d, 9e and of the sun gear 7 and of the crown wheel 8.

Consequently, the working pressure angle γ of the meshing between the planetary gears 9a, 9b, 9c, 9d, 9e and the crown wheel 8 is smaller than the pressure angle α2 of the sides 16b (FIG. 7).

Consequently, even though the pressure angle α2 is much greater than the pressure angle α1, the working pressure angle γ of the meshing between the teeth 13 of the planetary gears 9a, 9b, 9c, 9d, 9e and the teeth 12 of the crown wheel 8 is particularly small.

It is thus ensured that each planetary gear 9a, 9b, 9c, 9d, 9e presents two teeth 13 simultaneously meshing also with respective teeth 12 of the crown wheel 8.

The present applicant has likewise noted that a number of teeth 13, 11 (and 13, 12) simultaneously meshing higher than two, the differentiation of the pressure angles α1, α2, and the choice of the number ZP of teeth 13 smaller than the absolute value of the semidifference between the numbers ZS, ZC of teeth 11, 12 produces as synergistic effect a reduction of the levels of noise of the planetary gear train 6 as compared to planetary gear trains of a known type described in the introductory part of the present description.

The present applicant has likewise noted that both the contact ratios between the planetary gears 9a, 9b, 9c, 9d, 9e and the sun gear 7 (or crown wheel 8) and the quietness of the planetary gear train 6 are increased by the fact that the teeth 11, 12, 13 have end portions 50 that are relieved with respect to the corresponding starting involutes.

The planetary gears 9a, 9b, 9c, 9d, 9e moreover have a number ZP of teeth 13 smaller than what is envisaged by the standard proportioning.

In this way, it is possible to increase the interval between two instants at which pairs of the same teeth 13, 11 (or 12) come to mesh with one another.

Thus, the risk of possible damage of pairs of teeth 13, 11 (or 12) that are to mesh with one another being amplified and possibly generating a risk of damage to the entire planetary gear train 6 is minimized.

Finally, the planetary gear train 6 has a number of planetary gears 9a, 9b, 9c, 9d, 9e greater than three, and consequently the torques acting on the planetary gears 9a, 9b, 9c, 9d, 9e are not the same as one another for any condition whatsoever of loading and operation of the planetary gear train 6.

In order to render the torques acting on the planetary gears 9a, 9b, 9c, 9d, 9e as little uneven as possible, the phase angles β1, β4 are the same as one another and the phase angles β2, β3, β5 are the same as one another.

Finally, it is clear that modifications and variations may be made to the planetary gear train 6 and to the method described herein, without thereby departing from the sphere of protection of the present invention.

In particular, the planetary gear train 6 could be used in a convertiplane.

The invention claimed is:

1. A planetary gear train (6) for an aircraft (1) capable of fixed-point flight, comprising:
   a sun gear (7) that can turn about a first axis (A) and comprises a plurality of first teeth (11);
   a fixed crown wheel (8) comprising a plurality of second teeth (12); and
   at least two planetary gears (9a, 9b, 9c, 9d, 9e), each comprising a plurality of third teeth (13); said planetary gears (9a, 9b, 9c, 9d, 9e) each meshing with said crown wheel (8) and said sun gear (7) and being able to turn about respective second axes (B), which are in turn able to turn about said first axis (A);
   said planetary gear train (6) being characterized in that:
   at least two of said third teeth (13) simultaneously mesh with respective second teeth (12) and a further two of said third teeth (13) simultaneously mesh with respective first teeth (11);
   said third teeth (13) comprise a first side (16a) and a second side (16b), which have, respectively, a first pressure angle ($\alpha 1$) and a second pressure angle ($\alpha 2$) different from one another; and
   the number (ZP) of said third teeth (13) of each of said planetary gears (9a, 9b, 9c, 9d, 9e) is different from the absolute value of the semidifference ((ZC-ZS)/2) between the number (ZS) of said first teeth (11) of said sun gear (7) and the number (ZC) of said second teeth (12) of said crown wheel (8).

2. The planetary gear train according to claim 1, characterized in that said third teeth (13) mesh with respective said first teeth (11) on said first side (16a) and with respective second teeth (12) on said second side (16b); said first pressure angle ($\alpha 1$) being smaller than said second pressure angle ($\alpha 2$).

3. The planetary gear train according to claim 1, characterized in that said number (ZP) of said third teeth (13) is smaller than the absolute value of said semidifference ((ZC-ZS)/2).

4. The planetary gear train according to claim 3, characterized in that the absolute value of said semidifference ((ZC-ZS)/2) is greater than said number (ZP) of said third teeth (13) by a value comprised between 2 and 4.

5. The planetary gear train according to claim 1, characterized in that the working pressure angle ($\gamma$) of said second side (16b) is smaller than said second pressure angle ($\alpha 2$) by a value comprised between 4° and 8°.

6. The planetary gear train according to claim 1, characterized in that it comprises at least three of said planetary gears (9a, 9b, 9c, 9d, 9e) that can turn about respective second axes (B);
   each pair of immediately consecutive planetary gears (9a, 9b; 9b, 9c; 9c, 9d; 9d, 9e) being associated to a respective phase angle ($\beta 1$, $\beta 2$, $\beta 3$, $\beta 4$, $\beta 5$) defined between the lines joining the respective second axes (B) and said first axis (A);
   at least one first phase angle and one second phase angle ($\beta 1$, $\beta 4$; $\beta 2$, $\beta 5$) being different from one another.

7. The planetary gear train according to claim 6, characterized in that at least two of said first phase angles ($\beta 1$, $\beta$) are equal to one another.

8. The planetary gear train according to claim 7, characterized in that at least three of said second phase angles ($\beta 2$, $\beta 3$, $\beta 5$) are equal to one another and greater than said first phase angles ($\beta 1$, $\beta 4$).

9. The planetary gear train according to claim 1, characterized in that said first and second teeth (11; 12) each have respective sides (14a, 14b; 15a, 15b), which have respective further pressure angles different from one another.

10. The planetary gear train according to claim 1, characterized in that a first contact ratio associated to the meshing of each of said planetary gears (9a, 9b, 9c, 9d, 9e) with said sun gear (7) is greater than 2.5; and in that a second contact ratio associated to the meshing of each of said planetary gears (9a, 9b, 9c, 9d, 9e) with said crown wheel (8) is greater than 2.5.

11. The planetary gear train according to claim 1, characterized in that said first and second sides (16a, 16b) have respective end portions (50) relieved with respect to corresponding starting theoretical involutes;
   the plot of the distance between the points of each said end portion (50) and the corresponding starting involute along an axis (C) of said third tooth (13) comprising at least one first segment (E) and one second segment (F) inclined with respect to one another.

12. An aircraft capable of fixed-point flight, characterized in that it comprises:
   a rotor (4);
   an engine member; and
   a transmission (5) set between said rotor and said engine member and comprising a planetary gear train (6) according to any one of the preceding claims;
   said planetary gear train (6) comprising a planetary-gear carrier (30) connected to said planetary gears (9a, 9b, 9c, 9d, 9e);
   one (7) between said sun gear (7) and said planetary-gear carrier (30) receiving, in use, a torque from said engine member;
   the other (30) between said sun gear (7) and said planetary-gear carrier (30) being connected to a drive shaft of said rotor (4).

13. A method for producing a planetary gear train (6) for an aircraft (1) capable of fixed-point flight; said planetary gear train (6) comprising:
   a sun gear (7) that can turn about a first axis (A) and comprises a plurality of first teeth (11);
   a fixed crown wheel (8) comprising a plurality of second teeth (12); and
   at least two planetary gears (9a, 9b, 9c, 9d, 9e), each comprising a plurality of third teeth (13), said planetary gears (9) each meshing with said crown wheel (8) and said sun gear (7) and being able to turn about respective second axes (B), which are in turn able to turn about said first axis (A); said method being characterized in that it comprises the step of:
   setting at least two of said third teeth (13) so that they mesh simultaneously with respective second teeth (12) and a further two of said third teeth (13) so that they mesh simultaneously with respective first teeth (11);
   providing a first side (16a) and a second side (16b) of said third teeth (13), respectively, with a first pressure angle ($\alpha 1$) and a second pressure angle ($\alpha 2$) different from one another; and
   providing a number (ZP) of said third teeth (13) of each of said planetary gears (9a, 9b, 9c, 9d, 9e) different from the absolute value of the semidifference ((ZC-ZS)/2) between the number (ZS) of said first teeth (11) of said sun gear (7) and the number (ZC) of said second teeth (12) of said crown wheel (8).

14. The method according to claim 13, characterized in that said step of providing a number (ZP) of said third teeth (13) comprises the step of providing a number (ZP) of said third teeth (13) of each of said planetary gears (9a, 9b, 9c, 9d, 9e) smaller than the absolute value of said semidifference ((ZC-ZS)/2).

15. The method according to claim 13, characterized in that:
   said step of setting comprises the step of meshing said third teeth (13) with said first teeth (11) on said first side (16a) and of meshing said third teeth (13) with said second teeth (12) on said second side (16b); and
   said step of providing a first side (16a) and a second side (16b) comprises the step of providing said pressure angle ($\alpha 1$) with an amplitude smaller than said second pressure angle ($\alpha 2$).

\* \* \* \* \*